United States Patent
Lee et al.

(10) Patent No.: US 9,214,650 B2
(45) Date of Patent: Dec. 15, 2015

(54) BATTERY MODULE CASE

(75) Inventors: Won Jun Lee, Daejeon (KR); Dong Joo Lim, Gyeonggi-do (KR)

(73) Assignee: SK INNOVATION CO., LTD. (KR)

( * ) Notice: Subject to any disclaimer, the term of this patent is extended or adjusted under 35 U.S.C. 154(b) by 267 days.

(21) Appl. No.: 13/884,729

(22) PCT Filed: Nov. 14, 2011

(86) PCT No.: PCT/KR2011/008657
§ 371 (c)(1),
(2), (4) Date: Jul. 9, 2013

(87) PCT Pub. No.: WO2012/064160
PCT Pub. Date: May 18, 2012

(65) Prior Publication Data
US 2013/0280565 A1    Oct. 24, 2013

(30) Foreign Application Priority Data

Nov. 12, 2010 (KR) .......................... 10-2010-0112576

(51) Int. Cl.
*H01M 2/02* (2006.01)
*H01M 10/42* (2006.01)
*H01M 10/647* (2014.01)
(Continued)

(52) U.S. Cl.
CPC .......... *H01M 2/0207* (2013.01); *H01M 2/1077* (2013.01); *H01M 10/4207* (2013.01); *H01M 10/5032* (2013.01); *H01M 10/6556* (2015.04); *H01M 10/6561* (2015.04); *H01M 2/0237* (2013.01)

(58) Field of Classification Search
CPC ............ H01M 2/0207; H01M 2/0237; H01M 10/4207; H01M 2/1077; H01M 2/0275; H01M 10/5032; H01M 10/5063; H01M 10/5057
See application file for complete search history.

(56) References Cited

U.S. PATENT DOCUMENTS

| | | | |
|---|---|---|---|
| 2001/0010878 A1* | 8/2001 | Nakanishi et al. | 429/120 |
| 2005/0031946 A1* | 2/2005 | Kruger et al. | 429/159 |

(Continued)

FOREIGN PATENT DOCUMENTS

| | | |
|---|---|---|
| JP | 2001015090 | 1/2001 |
| JP | 2009021048 | 1/2009 |

(Continued)

OTHER PUBLICATIONS

International Search Report—PCT/KR2011/008657 dated May 8, 2012.

*Primary Examiner* — Muhammad Siddiquee
(74) *Attorney, Agent, or Firm* — Cantor Colburn LLP

(57) ABSTRACT

The present invention relates to a battery module case, and more particularly, to a battery module case in which sub-battery modules are slidably mounted in a vertical or horizontal direction, wherein each sub-battery module comprises one or more battery cells, electrode tabs extending in one direction from the respective battery cells, and a pouched type case consisting of aluminum laminate sheets for covering the surfaces of the battery cells, except for the surfaces on which the electrode tabs are formed. The battery module case of the present invention is formed into an assembly type structure to be coupled to the outer surfaces of the sub-battery modules, wherein the outer surfaces include surfaces on which the electrode tabs are formed. At least two or more sub-battery modules are stacked and arranged in parallel, such that the surfaces on which the electrode tabs are formed are aligned in the same direction.

7 Claims, 7 Drawing Sheets

(51) Int. Cl.
*H01M 2/10* (2006.01)
*H01M 10/6556* (2014.01)
*H01M 10/6561* (2014.01)

(56) References Cited

U.S. PATENT DOCUMENTS

2009/0017367 A1 1/2009 Marubayashi
2009/0305116 A1* 12/2009 Yang et al. ............ 429/61
2010/0279152 A1* 11/2010 Payne ..................... 429/50

FOREIGN PATENT DOCUMENTS

KR 1020060085775 7/2006
KR 1020060086119 7/2006

* cited by examiner

BATTERY MODULE CASE

TECHNICAL FIELD

The present invention relates to a battery module case, and more specifically, to a battery module case which has an assembly type structure which is separated into upper, lower, and side surfaces to modulate pouched type secondary batteries in a required amount, such that the utilization thereof is improved, assembly processes are simplified, heat radiation effect is increased, and an impact applied from the outside is minimized.

BACKGROUND ART

In general, a research into a technology in which a secondary battery capable of charging and discharging electricity unlike a primary battery is applied to high technology fields such as a digital camera, a cellular phone, a notebook computer, a hybrid automobile, and the like, has been actively conducted. As the secondary battery, a nickel-cadmium battery, a nickel-metal hydride battery, a nickel-hydrogen battery, and a lithium secondary battery are included.

Among them, the lithium secondary battery has an operation voltage of 3.6V or more to be used as a power supply of a portable electronic device or to be used in high power hybrid automobile by connecting batteries in a series. As compared to the nickel-cadmium battery or the nickel-metal hydride battery, the operation voltage of the lithium secondary battery is three times higher than those of the nickel-cadmium battery or the nickel-metal hydride battery, and energy density properties per unit weight are also excellent, such that the use of the lithium secondary battery has rapidly increased.

The lithium secondary battery is capable of being manufactured so as to have various shapes, and cylindrical type and prismatic type lithium secondary batteries have been usually exemplified for the lithium secondary battery. The lithium polymer battery in the recent spotlighted is manufactured in a pouched type having flexibility, such that the shape thereof is relatively varied. In addition, the lithium polymer battery has excellent stability and light weight, such that it is advantageous for slimness and lightness of a portable electronic device.

FIG. 1 is a view showing a structure of a pouched type lithium secondary battery 1 according to the related art, wherein the conventional pouched type lithium secondary battery 1 includes a battery part 2 and a case 3 providing a space in which the battery part 2 is accommodated.

Meanwhile, in the case in which high power lithium battery such as a hybrid automobile is required, several tens and hundreds of the poached type lithium secondary batteries shown in FIG. 1 are multilayered and connected to each other in series or in parallel, thereby obtaining a high voltage.

As described above, in the case in which a plurality of pouched type lithium secondary batteries are used to configure a middle and large-sized battery module, since a number of members are generally needed for mechanical and electrical connection, a process of assembling those members is significantly complicated. In addition, a space for coupling, welding, and soldering a number of members to each other is required, and accordingly a size of the entire system is increased. The increase in size is not preferred in view of limitation in a space of the system or a device having a middle and large-sized battery module mounted thereon.

Therefore, in order to be effectively mounted in a limited inner space such as an automobile, or the like, a middle and large-sized battery module case having a compact structure in which a number of pouched type lithium secondary batteries are capable of being strongly and stably multilayered, is required.

Further, in the case in which defects occur in a portion of the pouched type lithium secondary battery configuring the middle and large-sized battery module, since a large amount of time and many processes are required in disassembly and assembly processes for overcoming the defects, the battery module case which is easily capable of performing assembly and disassembly processes with a simple structure is highly required.

DISCLOSURE

Technical Problem

An object of the present invention is to provide a battery module case capable of improving utilization thereof by modulating pouched type secondary batteries in a required amount.

In addition, the present application is to provide a battery module case in which assembly processes are simplified, heat radiation effect is increased, and an impact applied from the outside is minimized.

Technical Solution

In one general aspect of the present invention, there is provided a battery module case including each sub-battery module slidably mounted in a vertical or horizontal direction, and formed in an assembly type structure to be coupled to outer peripheral surfaces of the sub-battery modules, wherein each sub-battery module includes one or more battery cells, electrode tabs extending in one direction from the respective battery cells, and a pouched type case consisting of aluminum laminate sheets for covering remaining surfaces of the battery cells, except for the surfaces on which the electrode tabs are formed, the outer peripheral surfaces include surfaces on which the electrode tabs are formed, and at least two or more sub-battery modules are stacked and arranged in parallel, such that the surfaces on which the electrode tabs are formed are aligned in the same direction.

In addition, the battery module case may further include: an upper housing coupled to surfaces on which the electrode tabs of the sub-battery module are formed; a lower housing in which a plurality of partition wall parts are formed on an inner side surface thereof so that each sub-battery module is slidably mounted in a vertical or horizontal direction, and the opposite side surface to the surface on which the electrode tabs of the sub-battery module are formed and one outer peripheral surface adjacent thereto are coupled to each other; and a side surface housing coupled to a remaining outer peripheral surface which is not coupled by the upper and lower housings, wherein the upper, the lower, and the side surface housings are coupled to each other.

Further, inner side surfaces of the upper housing and the side surface housing may be formed with a partition wall part having each sub-battery module mounted and fixed thereon.

In addition, a first insertion groove may be formed in a portion to which the side surface housing of the lower housing is coupled, a first protrusion part corresponding to the first insertion groove may be formed and insertedly coupled to the side surface housing, a second insertion groove may be formed in upper end portions of the lower housing and the side surface housing, and a second protrusion part corresponding to the second insertion groove may be formed and insertedly coupled to the upper housing.

Further, a first hollow part may be formed at both ends in a length direction of the upper housing, a second hollow part may be formed in a position corresponding to the first hollow part of the both ends in length directions of the lower housing and the side surface housing, and has a screw thread formed on inner peripheral surface thereof, and a bolt may be inserted into the first hollow part and the second hollow part so that the upper housing, the lower housing, and the side surface housing may be coupled to each other.

In addition, an outer side surface of the battery module case may be provided with an air flowing part having a hollow predetermined region.

Further, an inner side surface of the battery module case may be provided with at least one buffering members spaced apart from each other by a predetermined interval and provided in a space between the partition wall parts having each sub-battery module mounted and fixed thereon.

In addition, the battery module case may be formed so that one side surface and the other side surface thereof are opened in a width direction.

Advantageous Effects

As set forth above, in the battery module case according to the present invention, at least two or more pouched type secondary batteries are stacked and arranged in parallel, the surfaces on which the electrode tabs are formed are aligned in the same direction, and each poached type secondary battery is slidably mounted in a vertical or horizontal direction, and formed so as be coupled to the outer peripheral surfaces including the surfaces on which the electrode tabs of the pouched type secondary battery are formed, such that it is easy to modulate the pouched type secondary batteries in a required amount to improve utilization thereof.

In addition, the battery module case according to the present invention has an assembly type structure which is separated into upper, lower, and side surfaces, and the buffering member installed in the inner side thereof, such that assembly processes are simplified, the heat radiation effect is increased, and the impact applied from the outside is minimized.

Further, the battery module case according to the present invention is formed so as to cover the outer peripheral surface of the poached type secondary battery covered with the case formed of the aluminum laminate sheets, such that the rigidity may be complemented, and only the minimum amount of space need be occupied.

BEST MODE

Hereinafter, a battery module case 10 of the present invention having the above-described characteristics will be described in detail with reference to the accompanying drawings so that those skilled in the art may easily practice the present invention.

Figure 1:
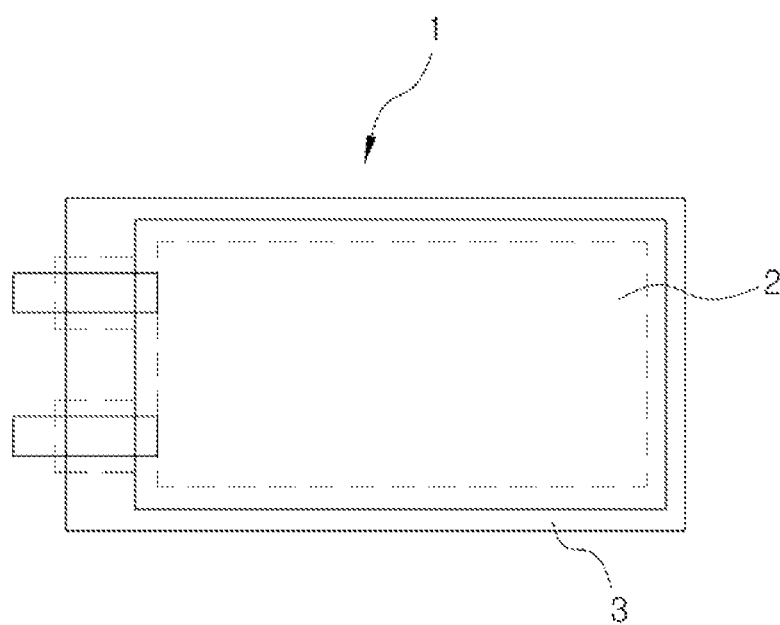
FIG. 1 a plan view showing a pouched type lithium secondary battery according to the related art.
Figure 2:
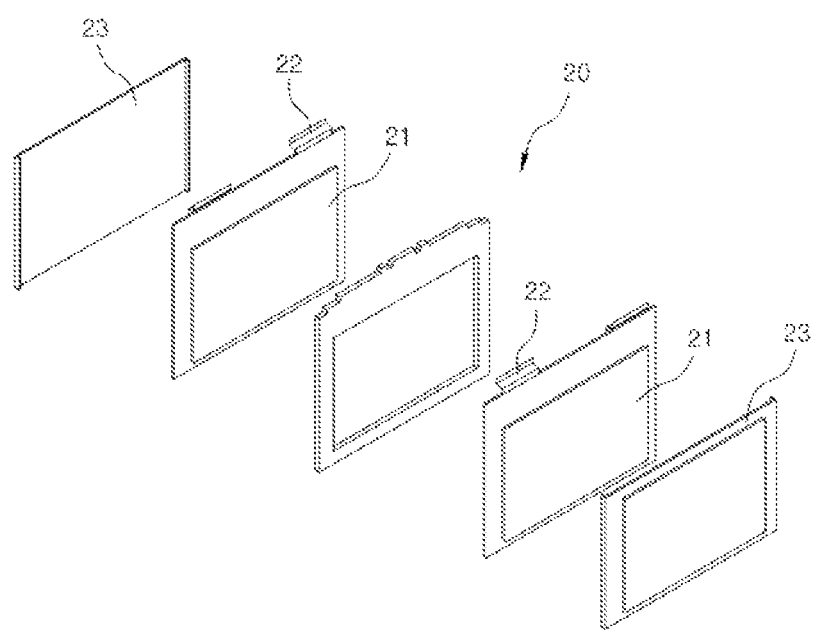
FIG. 2 is an exploded perspective view showing a sub-battery module according to the present invention.
Figure 3:
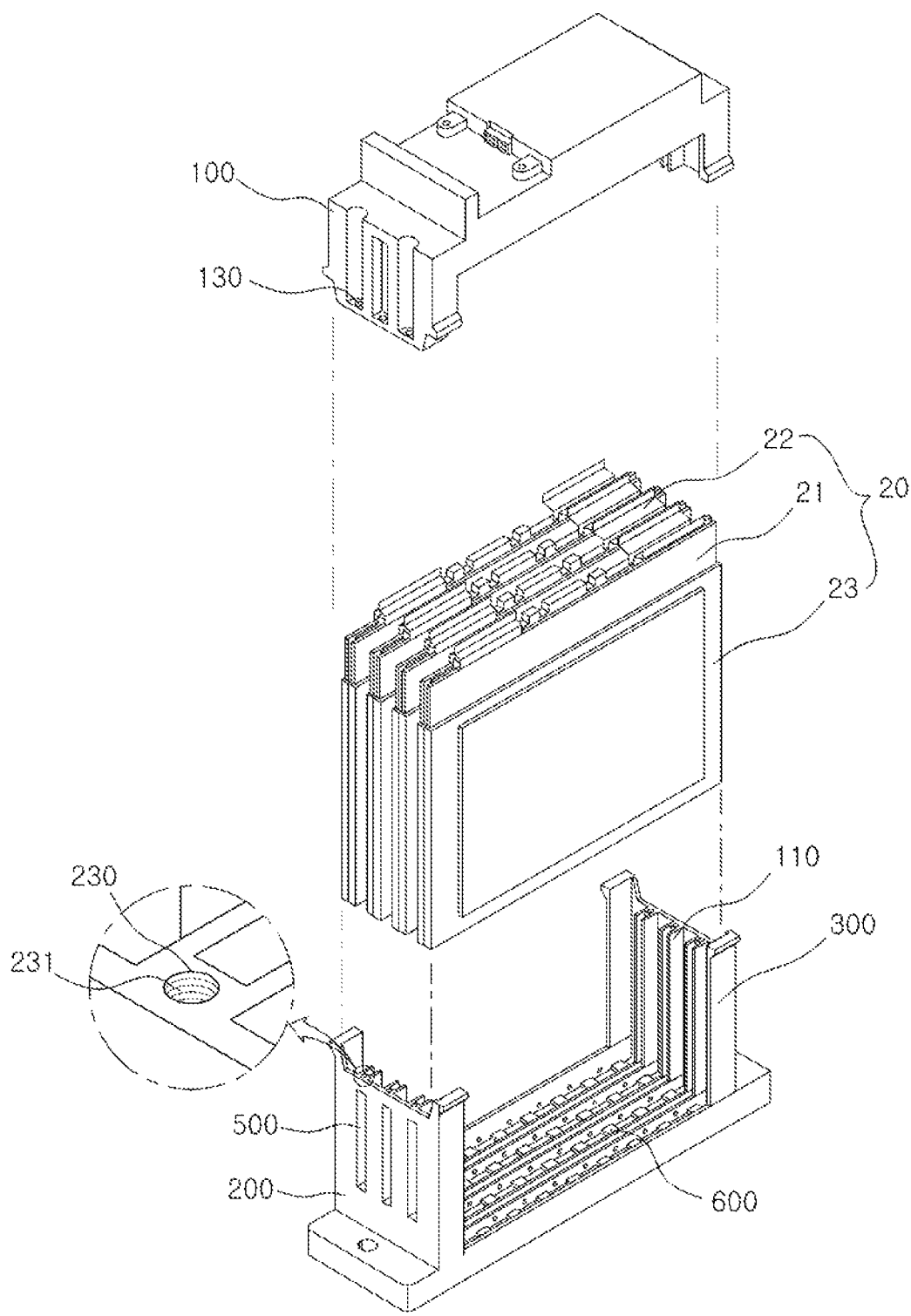
FIG. 3 is a partial exploded perspective view showing a battery module case according to the present invention.
Figure 4:
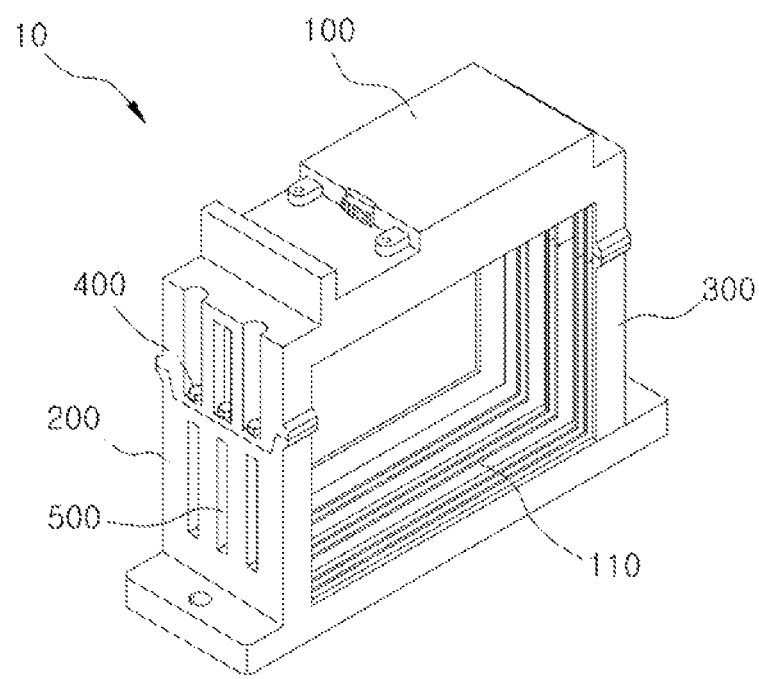
FIG. 4 is a perspective view showing a battery module case according to the present invention.
Figure 5:
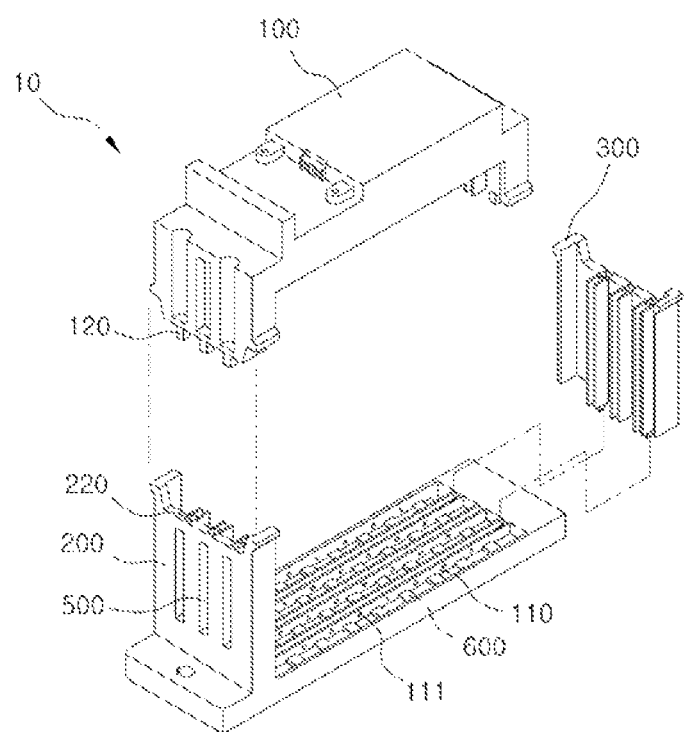
FIG. 5 is a partial exploded perspective view showing another battery module case according to the present invention.
Figure 6:
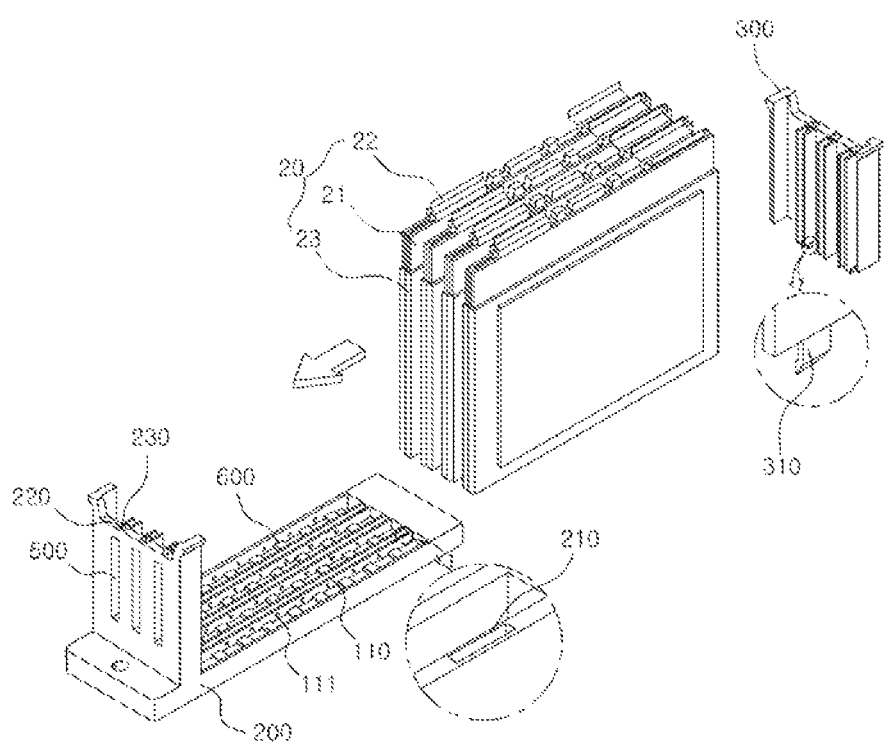
FIG. 6 is an exploded perspective view showing the other battery module case according to the present invention.
Figure 7:
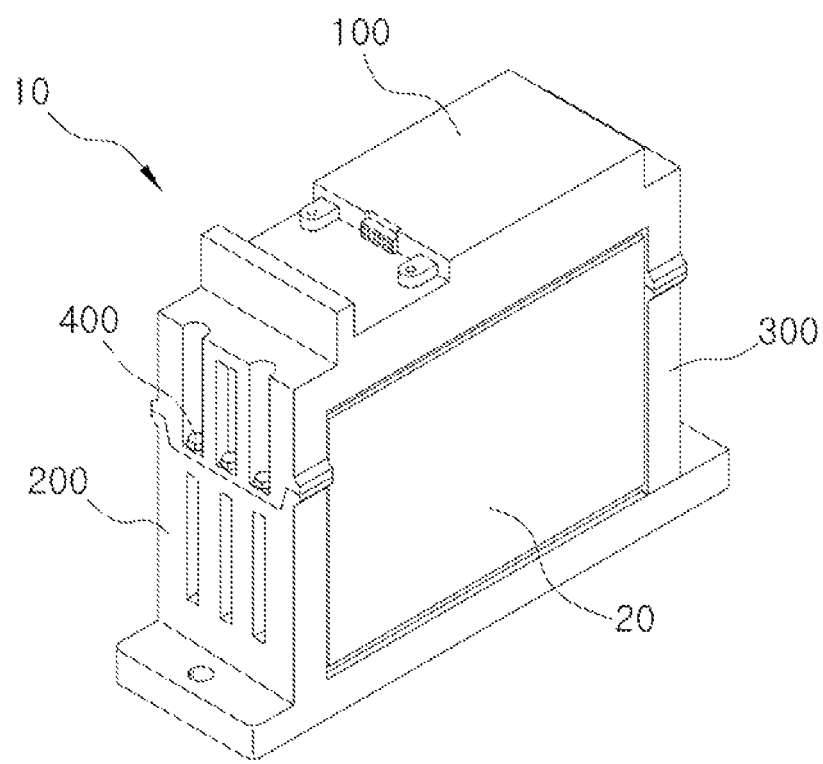
FIG. 7 is a perspective view showing a state in which the battery module case and the sub-battery module according to the present invention are assembled.

FIG. 1 is a plan view showing a pouched type lithium secondary battery according to the related art. FIG. 2 is an exploded perspective view showing a sub-battery module according to the present invention. FIG. 3 is a partial exploded perspective view showing a battery module case according to the present invention. FIG. 4 is a perspective view showing a battery module case according to the present invention. FIG. 5 is a partial exploded perspective view showing another battery module case according to the present invention. FIG. 6 is an exploded perspective view showing the other battery module case according to the present invention. FIG. 7 is a perspective view showing a state in which the battery module case and the sub-battery module according to the present invention are assembled.

The battery module case 10 of the present invention includes each sub-battery module slidably mounted in a vertical or horizontal direction, and formed in an assembly type structure so as to be coupled to outer peripheral surfaces of the sub-battery modules, wherein each sub-battery module includes one or more battery cells 21, electrode tabs 22 extending in one direction from the respective battery cells 21, and a pouched type case 23 consisting of aluminum laminate sheets for covering remaining surfaces of the battery cells 21, except for the surfaces on which the electrode tabs 22 are formed, the outer peripheral surfaces include surfaces on which the electrode tabs are formed, and at least two or more sub-battery modules are stacked and arranged in parallel, such that the surfaces on which the electrode tabs are formed are aligned in the same direction.

Here, the electrode tab 22 of the sub-battery module 20 may be welded to an electrode tab 22 of the adjacent sub-battery module 20.

The battery module case 10 of the present invention may include each sub-battery module 20 slidably mounted in a vertical or horizontal direction, and formed in an assembly type structure which is separated into upper, lower, and side surfaces to be coupled to the outer peripheral surfaces including the surfaces of the sub-battery modules 20 on which the electrode tabs 22 are formed.

In this case, as shown in FIGS. 3 to 7, the battery module case 10 may be mainly configured of an upper housing 100, a lower housing 200, and a side surface housing 300.

Here, in the lower housing 200, a plurality of partition wall parts 110 are formed on an inner side surface thereof so that each sub-battery module 20 is slidably mounted in a vertical or horizontal direction, and the opposite side surface to the surface on which the electrode tabs 22 of the sub-battery module 20 are formed and one outer peripheral surface adjacent thereto, that is, a lower side surface and a left side surface of the sub-battery module 20 shown in FIG. 2, are coupled to each other.

The lower housing 200 is formed in a 'ㄴ' shape, and has a plurality of partition wall parts 110 formed on the inner side surface thereof so that the sub-battery module 20 may be slidably mounted in a vertical or horizontal direction.

The side surface housing 300, which is coupled to one end portion of the lower housing 200, is coupled to a right-side surface of the sub-battery module 20 shown in FIG. 2, and is assembled with the lower housing 200 to be formed in a '⊏' shape which is rotated by 90° in an approximate counterclockwise direction.

The upper housing 100 is coupled to the surface of the sub-battery module 20 having the electrode tab 22 formed thereon, that is, an upper side surface of the sub-battery module 20 shown in FIG. 2, and is assembled at an upper end portion of the lower housing 200 and the side surface housing 300 to be formed so that the battery module case 10 has an approximate '⊏' shape.

Therefore, the battery module case 10 may be formed so that one side surface and the other side surface thereof are open in a width direction as shown in FIGS. 3 to 7.

The side surface housing 300 and the upper housing 100 may be formed with a partition wall part 110 having each sub-battery module 20 mounted and fixed on the inner side surfaces of the upper housing 100 and the side surface housing 300, similar to the partition wall part 110 formed in the lower housing 200.

Accordingly, a plurality of sub-battery modules 20 slidably mounted in a vertical or horizontal direction along the partition wall part 110 formed on the inner side surface of the lower housing 200 may be multilayered in parallel while maintaining a predetermined interval by the partition wall part 110 formed in the upper housing 100 and the side surface housing 300 coupled on remaining outer peripheral surface which is not coupled by the lower housing 200, and may be stably fixed to the battery module case 10.

As shown in FIGS. 5 and 6, in the battery module case 10, a first insertion groove 210 may be formed in a portion to which the side surface housing 300 of the lower housing 200 is coupled, a first protrusion part 310 corresponding to the first insertion groove 210 may be formed and insertedly coupled to the side surface housing 300, a second insertion groove 220 may be formed in upper end portions of the lower housing 200 and the side surface housing 300, and a second protrusion part 120 corresponding to the second insertion groove 220 may be formed and insertedly coupled to be fixed with the upper housing 100.

Therefore, the battery module case 10 may be coupled and fixed without a separate coupling member.

According to another embodiment of the present invention, as shown in FIGS. 3 and 4, the battery module case 10 may include a first hollow part 130 formed at both ends in a length direction of the upper housing 100, a second hollow part 230 formed in a position corresponding to the first hollow part 130 of the both ends in a length direction of the side surface housing 300, and has a screw thread 231 formed on inner peripheral surface thereof.

Here, a bolt 400 is inserted into the first hollow part 130 and the second hollow part 230, such that that the upper housing 100, the lower housing 200, and the side surface housing 300 may be coupled to each other.

A coupling method of the upper housing 100, the lower housing 200, and the side surface housing 300 configuring the battery module case 10 is not limited to the coupling method as described above, but may be arbitrarily and efficiently changed.

Meanwhile, it is preferred that the battery module case 10 has an air flowing part 500 having a hollow predetermined region which is formed on an outer side surface of the battery module case 10 so that external air flows for radiating heat of the sub-battery module 20 which is mounted on the inner side to be packaged.

A plurality of air flowing parts may be formed so as to be spaced apart from each other by a predetermined interval, and a shape thereof is not specifically limited.

In the battery module case 10, a space between the partition wall parts 110 having each sub-battery module 20 mounted and fixed thereon may be provided with at least one buffering members 600 spaced apart from each other by a predetermined interval.

As shown in FIGS. 3 and 5, a plurality of buffering members 600 having a protrusion shape may be provided in the space between the partition wall parts 110 formed on the inner side surface of the battery module case 10 while having a predetermined interval from each other, and may be made of a soft plastic or a rubber material to absorb an impact applied from the outside, thereby protecting the sub-battery module 20.

In addition, the buffering member 600 may be provided in a space between the partition wall parts 110 having the outer peripheral surface of the sub-battery module 20 mounted and fixed thereon, such that a predetermined space in which the air flows may be formed between the outer peripheral surface of the sub-battery module 20 and the inner side surface of the battery module case 10, thereby improving the heat radiation effect.

Here, the partition wall part 110 may be further provided with an air flowing hole 111 having a hollow predetermined region so as to be in communication with an empty space formed between the outer peripheral surface of the sub-battery module 20 and the inner side surface of the battery module case 10 by the buffering member 600.

Therefore, in the battery module case 10, at least two or more sub-battery modules 20 which are poached type secondary batteries are stacked and arranged in parallel, the surfaces on which the electrode tabs 22 are formed are aligned in the same direction, and each sub-battery module 20 is slidably mounted in a vertical or horizontal direction. In addition, the battery module case 10 is formed so as be coupled to the outer peripheral surfaces including the surfaces on which the electrode tabs 22 of the sub-battery module 20 are formed, such that it is easy to modulate the pouched type secondary batteries in a required amount to improve utilization thereof.

Further, the battery module case 10 has the assembly type structure which is separated into upper, lower, and side surfaces, and the buffering member 600 installed in the inner side, such that assembly processes are simplified, the heat radiation effect may be increased, and the impact applied from the outside may be minimized.

In addition, the battery module case 10 is formed so as to cover the outer peripheral surface of the pouched type secondary battery covered with the case formed of the aluminum laminate sheets, such that the rigidity may be complemented, and only the minimum amount of space need be occupied.

Further, the battery module case 10, which has an assembly type structure configuring the upper housing 100, the lower housing 200, and the side surface housing 300, may be formed so that each sub-battery module 20 is slidably mounted on the lower housing 200 in a vertical or horizontal direction, such that assembly and disassembly processes are possible even in a limited space.

In particular, in the case in which defects occur in a portion of the sub-battery module 20, since the battery module case 10 is required to be disassembled and assembled again for overcoming the defects, the battery module case 10 can be disassembled into three pieces as the upper housing 100, the lower housing 200, and the side surface housing 300, and slidably mounted in a vertical or horizontal direction, such that the assembly and disassembly processes are simplified even in a limited space.

The present invention is not limited to the above-described embodiments, and has various ranges to be applied. Therefore, those skilled in the art will appreciate that various modifications, additions and substitutions are possible, without departing from the scope and spirit of the invention as disclosed in the accompanying claims.

The invention claimed is:

1. A battery module case comprising: each sub-battery module slidably mounted in a vertical or horizontal direction; and formed in an assembly type structure to be coupled to outer peripheral surfaces of the sub-battery modules,
   wherein each sub-battery module includes one or more battery cells, electrode tabs extending in one direction from the respective battery cells, and a pouched type case consisting of aluminum laminate sheets for covering remaining surfaces of the battery cells, except for the surfaces on which the electrode tabs are formed,
   the outer peripheral surfaces include surfaces on which the electrode tabs are formed, and
   at least two or more sub-battery modules are stacked and arranged in parallel, such that the surfaces on which the electrode tabs are formed are aligned in the same direction,
   the battery module case includes:
   an upper housing coupled to surfaces on which the electrode tabs of the sub-battery module are formed;
   a lower housing formed in a shape in which two surfaces are orthogonal to each other, and in which a plurality of partition wall parts are formed on an inner side surface thereof so that each sub-battery module is slidably mounted in a vertical or horizontal direction, and the opposite side surface to the surface on which the electrode tabs of the sub-battery module are formed and one outer peripheral surface adjacent thereto are coupled to each other; and
   a side surface housing coupled to a remaining outer peripheral surface which is not coupled by the upper and lower housings,
   wherein the upper, the lower, and the side surface housings are coupled to each other.

2. The battery module case of claim 1, wherein inner side surfaces of the upper housing and the side surface housing is formed with a partition wall part having each sub-battery module mounted and fixed thereon.

3. The battery module case of claim 2, wherein a first insertion groove is formed in a portion to which the side surface housing of the lower housing is coupled,
   a first protrusion part corresponding to the first insertion groove is formed and insertedly coupled to the side surface housing,
   a second insertion groove is formed in upper end portions of the lower housing and the side surface housing, and
   a second protrusion part corresponding to the second insertion groove is formed and insertedly coupled to the upper housing.

4. The battery module case of claim 2, wherein a first hollow part is formed at both ends in a length direction of the upper housing,
   a second hollow part is formed in a position corresponding to the first hollow part of the both ends in length directions of the lower housing and the side surface housing, and has a screw thread formed on inner peripheral surface thereof, and
   a bolt is inserted into the first hollow part and the second hollow part so that the upper housing, the lower housing, and the side surface housing are coupled to each other.

5. The battery module case of claim 4, wherein an outer side surface of the battery module case is provided with an air flowing part having a hollow predetermined region.

6. The battery module case of claim 5, wherein an inner side surface of the battery module case is provided with at least one buffering members spaced apart from each other by a predetermined interval and provided in a space between the partition wall parts having each sub-battery module mounted and fixed thereon.

7. The battery module case of claim 6, wherein it is formed so that one side surface and the other side surface of the battery module case are opened in a width direction.

* * * * *